United States Patent [19]

Tyler

[11] Patent Number: 4,528,566
[45] Date of Patent: Jul. 9, 1985

[54] TRANSMITTER AND RECEIVER LOCATING DEVICE

[76] Inventor: Michael D. Tyler, 4 Elm St., Richwood, W. Va. 26261

[21] Appl. No.: 407,937

[22] Filed: Aug. 13, 1982

[51] Int. Cl.³ ............................................. G01S 5/04
[52] U.S. Cl. ................................... 343/419; 343/423
[58] Field of Search .............. 343/419, 423, 429, 430, 343/432, 437, 448, 457, 788, 760, 866, 869; 375/70; 315/419

[56] References Cited

U.S. PATENT DOCUMENTS

| | | | |
|---|---|---|---|
| 2,950,463 | 8/1960 | Brunn | 343/414 X |
| 3,061,831 | 10/1962 | Fromm | 343/439 X |
| 3,299,356 | 1/1967 | Bornhorst et al. | 375/70 X |
| 3,336,530 | 8/1967 | Sloan et al. | 343/419 X |
| 3,353,184 | 11/1967 | Kodron et al. | 343/423 |
| 3,626,416 | 12/1971 | Robow | 343/419 |
| 3,790,948 | 2/1974 | Ratkovich | 343/419 X |
| 4,001,828 | 1/1977 | Culpepper | 343/419 X |
| 4,176,356 | 11/1979 | Foster et al. | 343/423 |
| 4,410,890 | 10/1983 | Davis et al. | 343/419 |

OTHER PUBLICATIONS

Meyers, The Radio Amateur's Handbook, 1973, p. 236, FIG. 8-3(c).
O'Dell, Simple Antenna . . . Direction finding, QST Magazine, Mar. 1981, pp. 43-47.

*Primary Examiner*—Theodore M. Blum
*Assistant Examiner*—Brian Steinberger
*Attorney, Agent, or Firm*—Watson Cole Grindle & Watson

[57] ABSTRACT

A directional locating device transmits pulsed RF signals at a stabilized frequency and is carried by an object the direction of which is to be determined from a distance remote from the transmitter. A one-half wave delay line in the receiver is responsive to the signal detected by a directional antenna for generating a 180 degree out-of-phase signal with respect to the signal detected by a sense antenna. A variable inductance coupling transformer having a primary winding is connected directly to the sense antenna and the output of the one-half wave delay line to produce at a secondary winding of the transformer a summation signal representing the summation of the 180 degree out-of-phase signal and the signal detected by the sense antenna. A second stabilized RF signal is generated at a different frequency than the RF signals radiated by the transmitting means and input into a mixer detector also responsive to the amplified summation signal to produce an AF signal indicative of the direction of the transmitter means from the receiver when the directional antenna is rotated to any given position relative to the transmitting means. A speaker receives the amplified AF signal to generate audible and non-audible signals, the latter being indicative of the direction of said transmitter means from said receiver.

11 Claims, 7 Drawing Figures

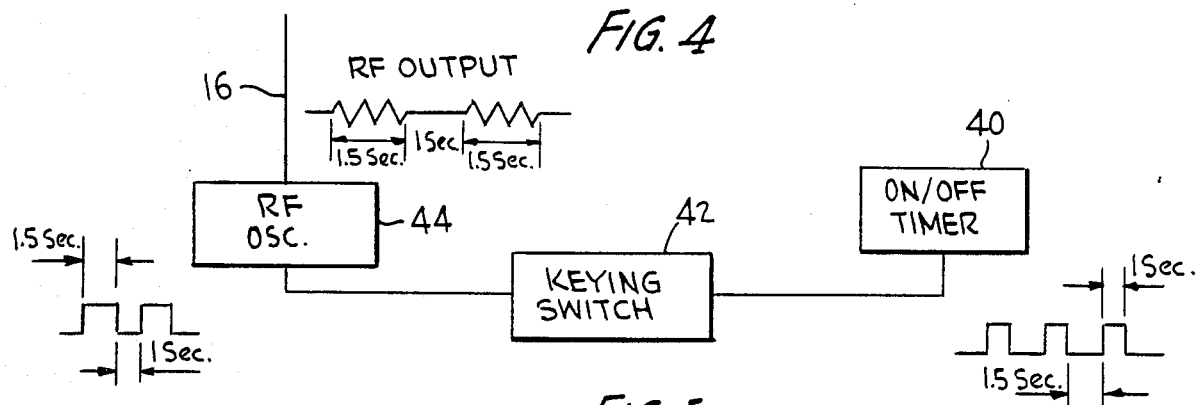
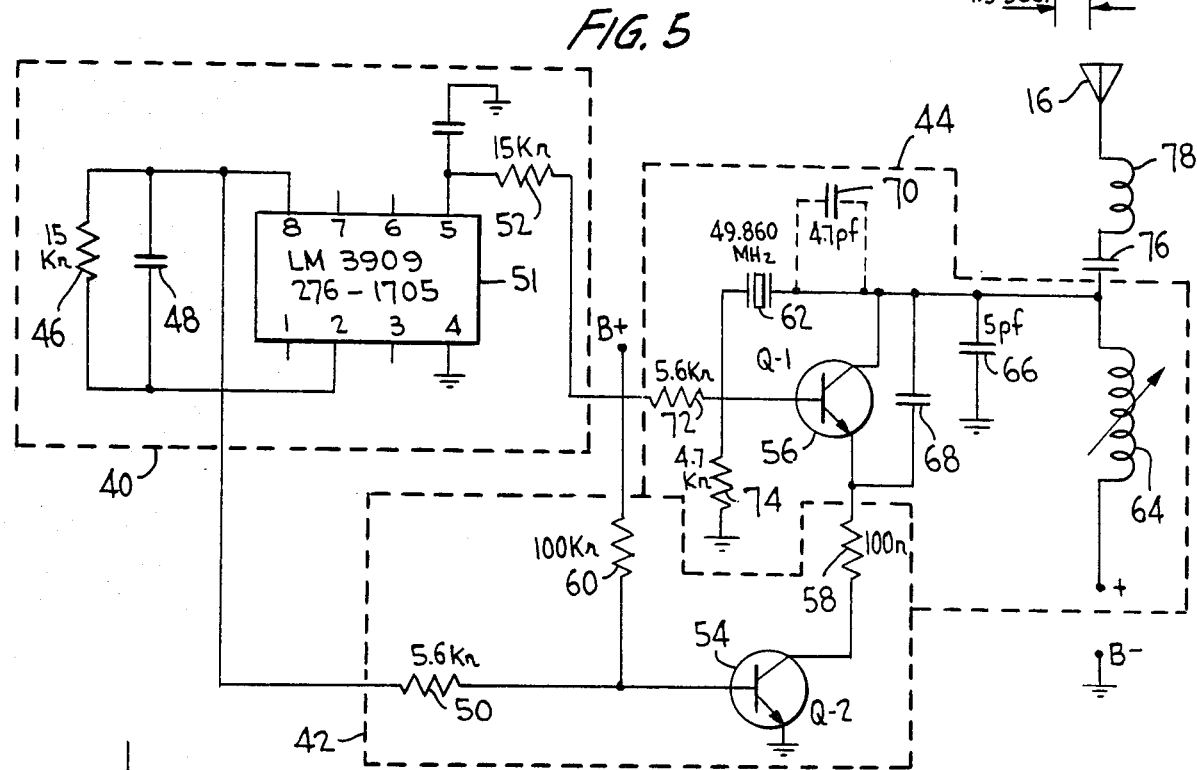
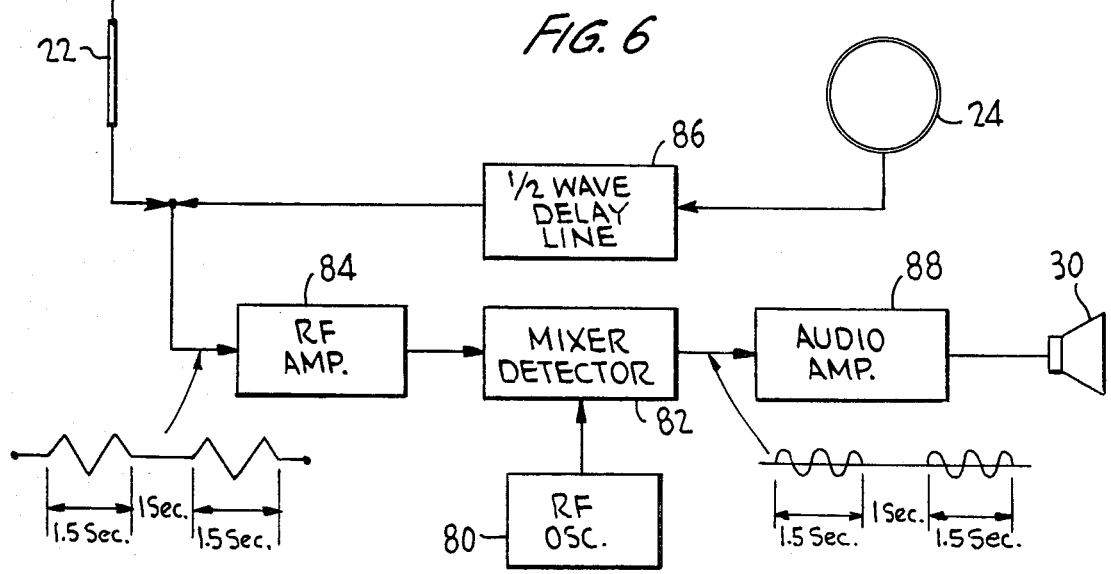

TRANSMITTER AND RECEIVER LOCATING DEVICE

BACKGROUND

1. Field of the Invention

The present invention relates to direction-finding systems and directional locating devices, and more particularly to transmitter and receiver apparatus for determining the relative direction to a remote source from which radio transmissions radiate from the transmitter and are detected by the receiver.

While the invention has particular application to the sport of hunting where a dog seeks to locate game such as birds, coon or bear, the transmitter and receiver circuitry of the invention can be utilized in other applications such as, for example, locating children in the woods by attaching the transmitter to a child's belt, or military use for locating, for example, parachutists, after a jump for the purpose of regrouping. The invention has generic application to the location of a moving object carrying a signal-generating transmitter by detecting the radiated transmitted signals with a receiver having directional-sensing capabilities.

2. Prior Art

U.S. Pat. No. 3,336,530, "Direction Finding System for Hunting Dogs", utilizes a miniaturized transmitter carried by a hound dog and an omni-directional antenna mounted on the dog's collar. A miniaturized receiver carried by the hunter includes a highly directional antenna, such as a loop antenna, as illustrated in FIG. 5 of the patent. However, this patent does not disclose details of the demodulator circuitry in the receiver and does not utilize, in combination, both a loop antenna and a "sense" antenna as does the subject invention.

U.S. Pat. No. 3,790,948 discloses a radio transmitter located in the head of a hunting arrow to enable a hunter to locate the arrow and/or the animal in which the arrow is embedded.

U.S. Pat. No. 3,626,416 discloses a direction finding receiver worn by an individual to determine the direction of a transmitted signal. The system incorporates a binaural receiver which converts the radio frequency signal received by the two antennas into a pair of audio frequency signals such that the phase relationship between the received radio frequency signals is preserved.

SUMMARY OF THE INVENTION

An object of the present invention is to provide a direction finding system for locating a remote object carrying a transmitter emitting or radiating RF signals.

An additional object is to provide a remote directional locating system that virtually eliminates indefinite directional readings associated with 180° out-of-phase null readings of prior known directional detection apparatus.

Yet a further object of the present invention is to provide a remote directional finding system as specified herein having acute sensitivity and affording very reliable indications of the direction to a remotely located object from which transmitted signals radiate.

Still a further object of the present invention is to provide a directional finding system having a wide range of applications for locating remote objects transmitting a directional finding signal that is detected by a receiver having special null-detecting capabilities affording omni-directional sensing capabilities.

The portable transmitter generates a C-W type A-1 transmission operating in the "license-free" 49 Mega Hertz band. The transmitter may be affixed to a collar, for example, for affixing to the movable object such as a dog, and includes a flexible steel whip antenna. A container held by the collar houses the transmitter with an RF oscillator, C-W generating circuitry and batteries. The transmitter generates RF waves that are crystal controlled at 49 Mega Hertz, for example, and is switched on and off at a predetermined rate defined by suitable switching circuitry. The switched RF energy is then coupled to the flexible steel whip antenna for radiation in all directions.

Another aspect of the directional finding system of the invention is a hand-held receiver which consists of a simple direct conversion receiver circuit capable of receiving unmodulated type A-1 energy as low as, for example, two-tenths (2/10) of one microvolt. The detected signal appears as an audible pulsing tone.

The pulsed transmission energy from the transmitter carried by the remote object to be located is detected by a "sense" antenna, which may be of the telescopic type, and a one-half ($\frac{1}{2}$) wave loop antenna spiral-wrapped on a plastic loop and mounted on top of the receiver housing together with the "sense" antenna. The receiver housing contains all the batteries and circuitry necessary for operation of the directional receiver.

RF energy detected by the loop and the "sense" antenna and input into the receiver circuitry. As the receiver is rotated in a horizontal plane, when the loop antenna is perpendicular to (facing) the direction from which the pulsed transmission is eminating, the detected RF signal nulls down or disappears, resulting in a distinct lowering or complete absence of a beeping audible tone from a speaker. The nulling effect is used to determine the direction from the receiver to the transmitter.

Because of the position of the loop antenna with respect to the "sense" antenna, the system is not sensitive to "nulling" in the 180° out-of-phase direction. Thus, with the circuitry of the invention, guessing is eliminated as to the radiated signal transmission in the 180° out-of-phase direction.

Thus, the invention contemplates a transmitter, carried by an object to be located at a remote distance from a directional receiver, to generate an unmodulated carrier wave (C-W type A-1 transmission) signal on a preset frequency, preferably one that is "license free". The carrier wave is automatically pulsed on and off at a pre-determined rate.

More specifically, the receiver is a hand-carried unit incorporating thereon a telescoping whip antenna and a directional loop antenna, with the signal appearing at the whip antenna being fed directly to the input of an RF amplifier. The directional loop antenna consists of a one-half ($\frac{1}{2}$) wave resonant loop and is designed such that very little signal, or no signal at all, is received except when the loop antenna faces in the direction of the transmitted signals. The signal from the loop antenna is input to a one-half ($\frac{1}{2}$) wave delay line, the output of which is also input to the RF amplifier. The phase shift of the signal from the directional loop antenna produces a signal-cancelling or nulling effect with respect to the signal detected by the "sense" whip antenna. The output of the RF amplifier is input into a mixer detector circuit which also receives the output of a RF oscillator circuit. The RF oscillator is crystal-controlled, or otherwise accurately stabilized, as is the oscillator in the transmitter. The mixer detector circuit is a direct conversion detector, the function of which is to mix the uncancelled signal with the oscillator signal from the crystal-controlled RF oscillator that is operating on the same frequency as the transmitter, plus or minus 400 to 1,000 Hz, for example. Thus, the resulting difference in the crystal-controlled oscillator signal and the transmitter carrier signal would be 400 to 1,000 Hz. This audio signal is coupled to an audio amplifier, the output of which is used to drive a speaker or earphone.

The directional detection system is operated by the operator holding the receiver with the loop and whip antenna in a vertical oriented position. The receiver is then horizontially rotated until the beeping sound emitted from the speaker or earphone nulls, or considerably diminishes in amplitude, to provide an indication of the direction of the object carrying the transmitter. The range of the unit may be approximately one (1) to three (3) miles, for example, with the particular circuitry as described herein.

BRIEF DESCRIPTION OF THE DRAWING

The above objects, advantages, and features of the present invention are readily apparent from the following description of a preferred embodiment representing the best mode of carrying out the invention when taken in conjunction with the following drawings, wherein:

FIG. 4 is a block diagram of the transmitter circuitry;

FIG. 5 is a circuit schematic of the transmitter in accordance with the invention;

FIG. 6 is a block diagram of the directional locating receiver circuitry in accordance with the invention.

DESCRIPTION OF THE PREFERRED EMBODIMENT

While the following description of the preferred embodiment of the invention is taken with regard to an application directed to hunting, it is to be clearly understood that the invention can be utilized in a diverse number of applications requiring the directional location of a remote object, which is typical of the need for directional finding systems in general.

Figure 1:
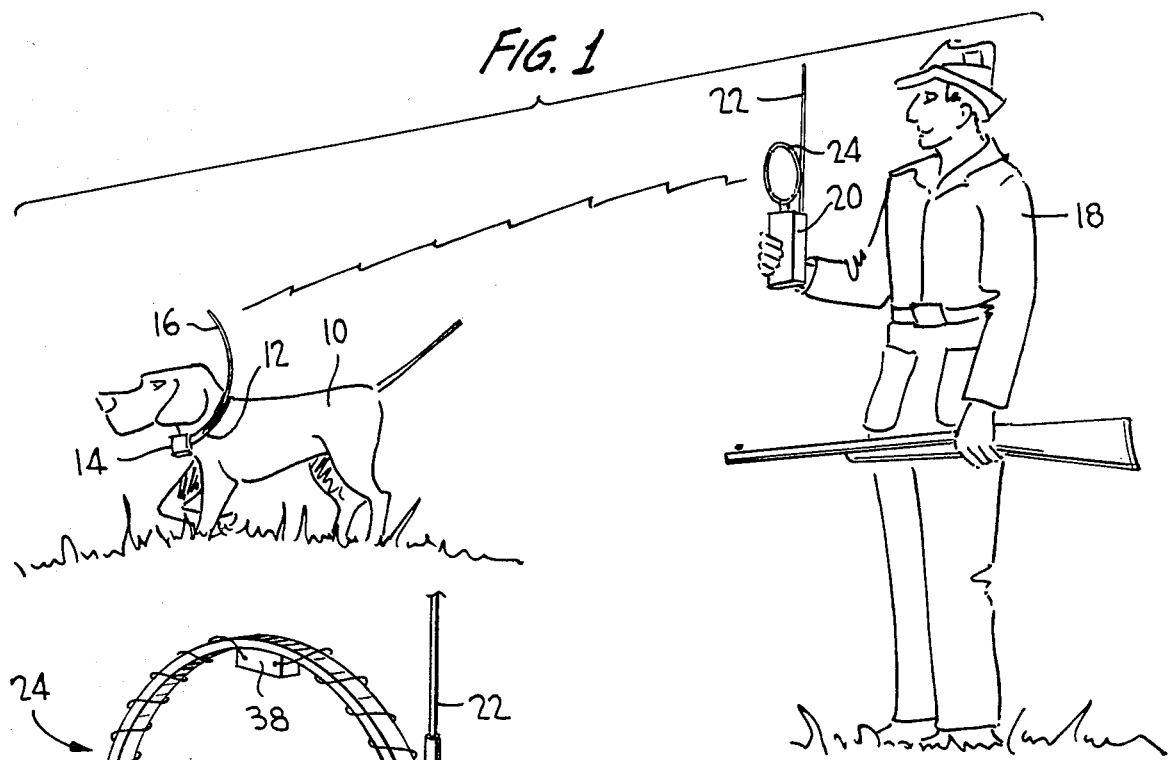
FIG. 1 is a pictorial view illustrating the application of the present invention to the field of hunting.

In the pictoral representation of the hunting application illustrated in FIG. 1, a hunting dog 10 is shown wearing a collar 12 on which are mounted transmitter 14 and a transmission antenna 16. Collar transmitter 14 and antenna 16 generate RF frequency signals that are crystal-controlled at, for example, 49 Mega Hertz. This frequency band is preferred as it is "license free", however, the invention is capable of being adapted to use other RF frequencies. The generated RF wave is switched ON/OFF at a predetermined rate defined by switching circuitry within transmitter 14, which is more fully described hereinafter with respect to FIGS. 4 and 5. The switched RF energy is then coupled to antenna 16, which may be, for example, a flexible steel whip antenna known to the art, with the RF signal coupling being in a manner also known.

A hunter 18 carries a hand-held receiver 20 having a telescopic antenna 22, referred to hereinafter as the sense antenna, and a one-half (½) wave loop antenna 24 spiral-wrapped on a seven inch (7") plastic loop, for example. Conveniently, both the sense antenna 22 and the directional antenna 24 may be mounted on top of receiver 20.

The RF pulsed transmitted energy detected by sense antenna 22 and directional antenna 24 is input into receiver circuitry, to be more fully described hereinafter with respect to FIGS. 6 and 7. As receiver 20 is rotated in a horizontal plane by the hunter, the RF detected signal will null down or disappear as the loop antenna 24 is rotated in a direction perpendicular to the direction from which the transmitted signals are radiating. The nulling-down ideally results in a absence of an audible beeping tone such that the direction of the transmitter can be readily determined. A particular advantage of the manner in which the transmitted signals are received is that, because of the position of the loop antenna 24 with respect to sense antenna 22, the system is not sensitive to "nulling" in a false 180° out-of-phase direction as is commonly the problem with prior art directional detection systems. Thus, the receiver of the present invention is very useful in that it eliminates guessing as to the direction of the transmitted signals.

Figure 2:
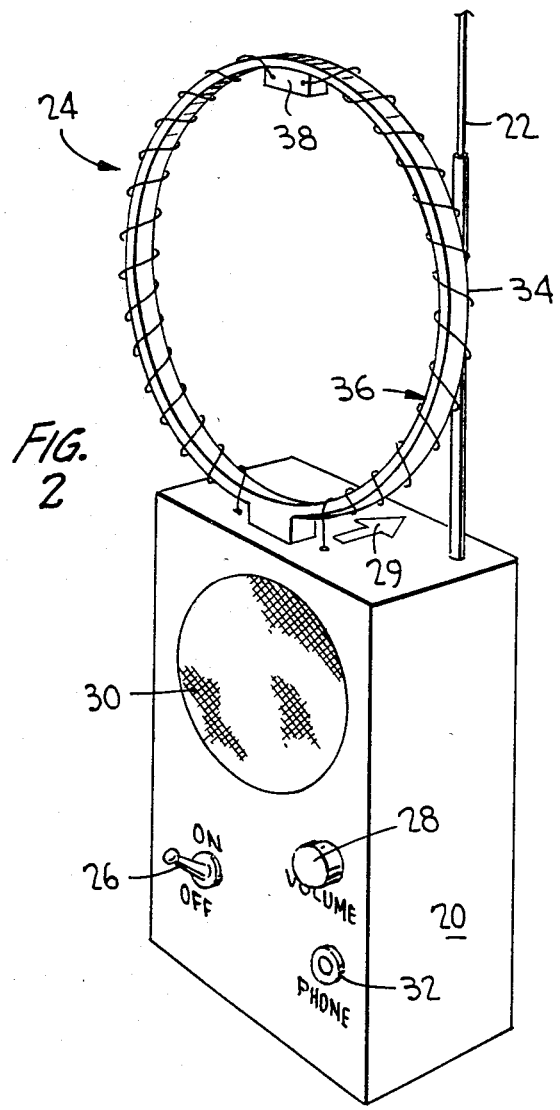
FIG. 2 shows the receiver with the directional loop antenna and a telescoping "sense" antenna mounted thereon.

Receiver 20, illustrated in FIG. 2, includes ON/OFF switch 26, volume control 28, speaker 30 and a phone-jack 32, the latter enabling the hunter to wear earphones which may be useful in further enhancing the detection of the null signal.

Sense antenna 22 and loop antenna 24 are shown mounted on top of receiver 20. Sense antenna 22 is preferably of the telescoping type well known to radio receiver systems. Sense or loop antenna 24 may preferably consist of a seven inch (7") diameter plastic loop 34 around which is spirally-wrapped a one half (½) wave loop 36. Variable capacitor 38 is provided to enable the loop antenna 24 to be tuned in a manner known to the art and described more fully hereinafter with regard to the receiver circuitry illustrated in FIGS. 6 and 7. Loop antenna 24 is preferably fixably mounted to receiver 20 and the entire receiver is rotated in order to determine the direction to the transmitted signals. However, if desirable, directional loop antenna 24 may be rotatable with respect to receiver housing 20. All of the necessary receiver circuitry is mounted within receiver housing 20. The top of receiver 20 is marked with arrow 39 as an aid in finding the direction to the transmitted signals.

Figure 3:
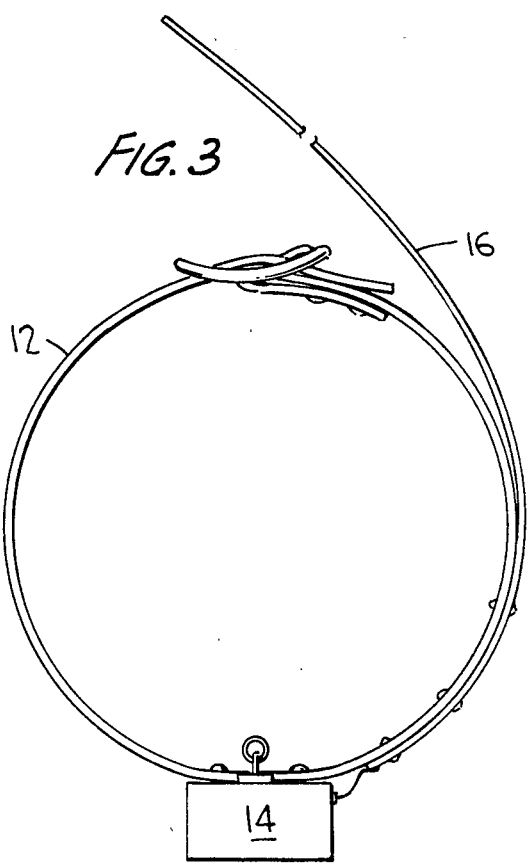
FIG. 3 illustrates the transmitter mounted on a collar along with an antenna.

FIG. 3 illustrates collar 12 with transmitter 14 and antenna 16 mounted thereon. Transmitter 14 is actuated by, for example, a button switch which is pulled out to turn the transmitter on and pushed in to turn the transmitter off. Other types of switches, such as slide switches may also be used. Transmitter 14 may be affixed to collar 12 in any known manner, such as by looping the collar underneath spaced attaching members. Flexible steel whip antenna 16 may be attached to collar 12 in any convenient manner, such as is by spaced wrappings of plastic string or cord.

FIG. 4 illustrates a block diagram of transmitter 14 having ON/OFF timer 40, keying switch 42 and RF oscillator 44. ON/OFF timer 40 preferably generates a pulse output with a one second ON duration and a 1.5 second interval between pulses as illustrated in FIG. 4. Keying switch 42 essentially inverts the output of ON/OFF timer 40 to provide a pulse input to RF oscillator 44 in which the individual pulses have a 1.5 second duration with a one second OFF interval therebetween.

The time interval between pulses is not critical and may be varied. One of the primary criteria of the pulse interval is that the ultimate sounds produced thereby (to be more fully described hereinafter) not annoy the operator of the locating device, particularly after the locating device has been used for a considerable time. The time interval specified herein in describing the preferred embodiment of the invention, while being only exemplary of suitable intervals, was found to produce a sound output that enhances or optimizes the direction determining characteristics of the locating device as receiver 20 is rotated in a horizontal plane by the rotation of the operator's body, such that the movement of the operator's body and the sound rate are compatible with one another. The primary reasons for not using a continuous tone, as opposed to a pulsing or beeping sound is that a continuous tone is much harder to work with due to signal propagation changes, whereas with an interrupted tone the operator merely has to listen for the beeps to be present or absent. Additionally, interrupting the sound output of the receiver conserves battery life as maximum current is not being drawn continuously but only during the ON intervals of the pulses.

In the preferred embodiment described herein, RF oscillator 44 is crystal-controlled to operate at a frequency of 49.860 MHz to provide C-W type A-1 transmission. The output of RF oscillator 44 drives, for example, a 15 inch flexible whip antenna as illustrated in FIG. 4. The RF signal generated by RF oscillator 44 is then transmitted omni-directionally by the flexible whip antenna 16.

The transmitter 14 circuitry is illustrated schematically in FIG. 5 and is operated by a nine (9) volt DC battery, which may be conveniently contained within the housing of the receiver. ON/OFF timer circuit 40 is an integrated circuit (such as a LM 3909) that generates TURN-ON pulses with a rate controlled by the R-C network of resistor 46 and capacitor 48. The ON/OFF pulse train output of ON/OFF timer 40 is input to the RF oscillator 44 by means of resistor 50, with the RF oscillator 44 being keyed by means of keying switch circuit 42, the input of which is connected by means of resistor 50 to the upper common node of resistor 46 and capacitor 48 in ON/OFF timer circuit 40. Integrated circuit 51 is connected to the B+ voltage through resistor 52.

Keying circuit switch 42 essentially consists of switching transistor 54 having the collector thereof connected to the emitter of transistor 56 in RF oscillator 44 through resistor 58. The base of switching transistor 54 is connected through resistor 60 to the B+ battery voltage, and through resistor 50 to the R-C timing circuit previously described. The emitter of transistor 54 is grounded.

The RF oscillator consists of transistor 56, 49.860 MHz crystal 62 and a tank circuit comprising inductor 64 and capacitor 66. Feedback is provided by the collector-to-emitter capacitor 68. Trimming capacitor 70 is optionally connected between crystal 62 and the collector of oscillator transistor 56. RF oscillator 44, and in particular oscillator transistor 56, is keyed ON/OFF by the output of ON/OFF timer 40 through resistors 72 and 74 which provide forward bias for transistor 56. The 49.860 MHz C-W A-1 pulsed ON/OFF output of transmitter 44 is coupled to transmitter antenna 16, through capacitor 76 and inductor 78 in a manner known to those skilled in the RF transmission art.

The block diagram of the direct conversion directional locating receiver 20 is illustrated in FIG. 6 and comprises RF oscillator 80, the output of which is input to mixer detector 82, which in turn receives the amplified received locating signal from telescopic whip antenna 22 and directional loop antenna 24 and which is amplified by RF amplifier 84. The 49 MHz transmitted signal which is detected by directional loop antenna 24 is thendelayed by one-half ($\frac{1}{2}$) wave delay line 86, and then fed, along with the output of whip antenna 22, to the input of RF amplifier 84. The nature of the RF signal at the input of RF amplifier 84 is illustrated in FIG. 6.

The output of mixer detector 82 is input to audio amplifier 88, the amplified output of which is made audible by speaker 30. The nature of the mixer detector output, i.e., the AF signal is also illustrated in FIG. 6.

Figure 7:
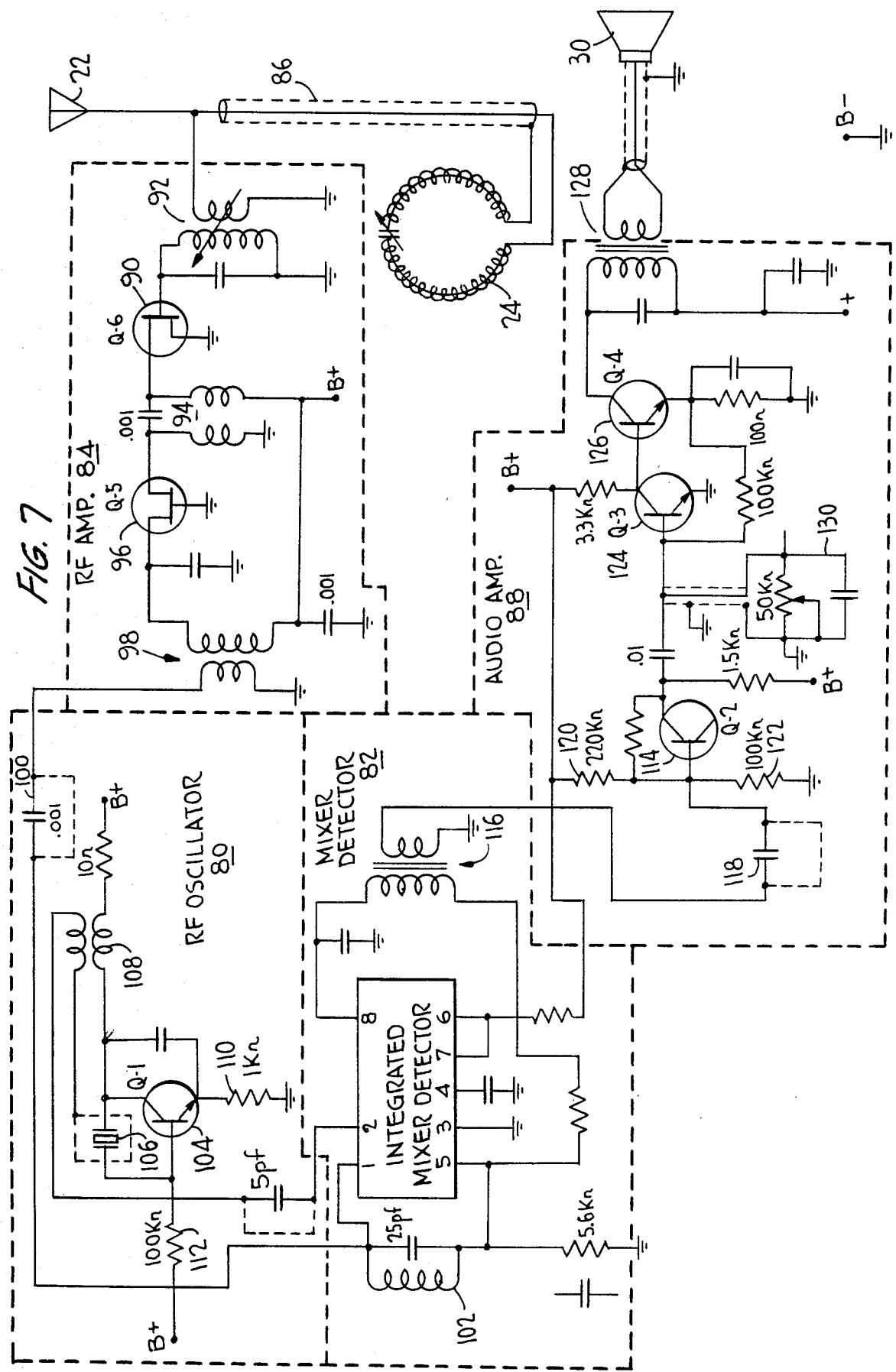
FIG. 7 is a circuit schematic of the directional locating receiver circuitry in accordance with the present invention.

The circuit schematic of FIG. 7 illustrates the circuitry comprising the directional locating receiver 20. The transmitted signals appearing at telescopic antenna 22 are coupled directly to the gate input of field effect transistor (FET) 90 by means of coupling transformer 92 in RF amplifier 84. Loop antenna 24 is a tuned circuit and is resonant at the operating RF frequency of 49.860 MHz such that the directionally detected signal appears at the loop antenna 24 when it is directly facing the transmitted signals from transmitter 14 on the object to be located. The RF energy from directional loop antenna 24 is fed to a one-half ($\frac{1}{2}$) wave delay line 86 which causes the signal from telescopic antenna 22 and the signal from the directional loop antenna 24 to appear out of phase at the gate input of FET 90. This out-of-phase condition causes a signal absence, or nulling, of the received signal resulting in an indication of the direction to the transmitted signal from the object to be located. Rotating the receiver 20 causes loop antenna 24 to fail to detect any transmitted signals such that the signals appearing from "sense" antenna 22 are not nulled or cancelled out. The operation of directional locating receiver 20 as illustrated in FIG. 7 can be briefly summed by the statement that an audible beeping is normally heard from speaker 30 until the receiver directional loop antenna 24 is rotated perpendicular to the transmitted signals radiating from the transmitter carried by the object to be located. At such time the beeping nulls, or disappears, thereby indicating the direction to the transmitted signals.

The detection system described herein is essentially fail-safe for 180° null sensing for at least the following reasons, which are described with reference to that which is illustrated in FIG. 2. The position of telescopic sense antenna 22, relative to directional loop antenna 24 is such that each antenna is within "magnetic reach" of one another. The left side of the loop 34 (as viewed in FIG. 2) is the "cold" side and with loop 34 turned to resonant frequency of the transmitted signal by variable tuning capacitor 38, when the directional antenna 24 faces perpendicular to a weak transmitted signal and is adjusted for maximum amplitude, the system becomes insensitive to a 180° out-of-phase signal. Thus, when operating the system, a transmitter that is located behind the operator simply will not null down.

The source of FET 90 is grounded and the drain thereof, representing the amplified output of the signals at the gate thereof, are fed through coupling circuit C-L 94 to the source of FET 96, the gate of which is grounded. The drain output of FET 96, representing the amplified RF energy from antennas 22 and 24, is input to mixer detector circuit 82, which is a CA 3028 integrated circuit, by means of coupling transformer 98. Trimming capacitor 100 may be optionally inserted from the output of coupling transformer 98 to the input of mixer detector circuit 82.

Tuned circuit 102 is tuned to the RF frequency of 49.860 MHz. Mixer detector circuit 82 also receives an oscillator input from RF oscillator 80, which comprises transistor 104, crystal 106 and a tuned tank circuit 108. The emitter of transistor 104 is grounded through resistor 110 and the base of transistor 104 is connected to the B+ power voltage via resistor 112. Feedback tank circuit 108 is connected between the collector and base of transistor 104 in a manner well known to those skilled in the radio frequency receiver art. The output of RF oscillator 80 is taken from RF choke 108 and input to terminal 2 of mixer detector circuit 82. The RF oscillator output and the RF amplified output from RF amplifier 84 are mixed in mixer detector circuit 82 to generate an audible tone resulting from the slight difference in the oscillator frequency of RF oscillator 80 and the amplified frequency output of RF amplifier 84. The output signal from mixer detector circuit appears at terminals 6–8 and is fed as an audible signal to transistor 114 in audio amplifier 88 through coupling transformer 116. An optional coupling capacitor 118 may be provided from the output of coupling transformer 116 to the base of the first stage of audio amplification transistor 114. Transistor 114 is biased by resistors 120 and 122, with the emitter thereof grounded, and the amplified output thereof provided to transistors 124, 126, for additional audio amplification at a high level of audio output to operate speaker 30, which is driven from the collector output of transistor 126 through driver transformer 128. The volume output of speaker 30 is controlled by potentiometer 130 located between the collector output of transistor 114 and the base input of transistor 124.

It is, therefore, desired that the present invention not be limited to the preferred embodiment specifically described herein, but that it include all such modifications and variations that would be apparent to those skilled in the art to which the invention is directed. The scope of my invention should be determined by the equivalents of the various terms as recited in the following annexed claims.

What I claim is:

1. A directional locating device, comprising:
means for transmitting radiating RF signals at a stabilized frequency and carried by an object the direction of which is to be determined from a distance remote therefrom;
receiver means located remotely from said transmitting means for receiving said radiated RF signals to provide indication of the direction to said transmission means, and comprising a sense antenna and a directional antenna;
said receiver means comprising:
a one-half wave delay line responsive to the signal detected by said directional antenna for generating a 180 degree out-of-phase signal with respect to the signal detected by said sense antenna;
said directional antenna is a loop antenna;
a variable inductance coupling transformer having a primary winding connected directly to said sense antenna and the output of said one-half wave delay line to produce at a secondary winding of said transformer a summation signal representing the summation of said 180 degree out-of-phase signal and the signal detected by said sense antenna;
RF amplifying means for amplifying said summation signal;
oscillation means for generating a second stabilized RF signal at a different frequency than the RF signals radiated by said transmitting means;
mixer detector means responsive to the amplified summation signal and said second stabilized RF signal to generate an AF signal indicative of the direction of said transmitter means from said receiver when said directional antenna is rotated to any given position relative to said transmitting means;
amplifying means for amplifying said AF signal; and
a speaker connected to receive said amplified AF signals for generating audible and non-audible signals, the latter being indicative of the direction of said transmitter means from said receiver.

2. A directional locating device as claimed in claim 1, wherein said means for transmitting includes switching means for generating a train of RF control signals with each pulse therein having a specified ON/OFF ratio; and second stabilized oscillation means responsive to said control signals for generating stabilized RF frequency output signals coupled to an antenna for radiating said RF signals.

3. A directional locating device as claimed in claims 1 or 2, wherein said switching means includes an ON/OFF timer circuit for generating turn-on pulses at a specified rate, and a keying switch circuit responsive to said turn-on pulses to generate said train of RF control signals.

4. A directional locating device as claimed in claim 3, wherein said ON/OFF timer circuit includes integrated circuitry and the rate of said turn-on pulses is controlled by a R-C network connected to an input thereof.

5. A directional locating device as claimed in claim 3, wherein said keying switch circuit includes a grounded emitter inverting transistor with the base electrode thereof responsive to said train of RF control signals and providing an inverted train of said RF control pulses at the collector thereof.

6. A directional locating device as claimed in claim 3, wherein said second stabilized oscillation means includes an oscillating transistor, a crystal operating at said stabilized frequency connnected between the base and collector electrodes of said oscillating transistor, and a tank circuit tuned to the stabilized frequency of said crystal and connected between the collector electrode and the emitter electrode of said oscillating transistor, the base electrode of said oscillating transistor being connected to a voltage source through biasing resistors and the emitter electrode thereof being connected to receive said inverted train of control pulses and the stabilized oscillating frequency output at said collector electrode being coupled to an omni-directional radiating antenna.

7. A directional locating device as claimed in claim 1, wherein said mixer detector means includes an integrated circuit and a tuned circuit connected to an input thereof and tuned to the RF stabilized frequency of the RF signal radiated from said means for transmitting and being connected to be responsive to said summation signal.

8. A directional locating device as claimed in claim 1, wherein said oscillating means includes an oscillating transistor, a crystal operating at a frequency different than the stabilized frequency of the RF signal radiated by said means for transmitting and connected between the collector and base of said oscillating transistor, and the oscillating frequency of said crystal being output through an RF choke to said mixer detector means.

9. A directional locating device as claimed in claim 1, wherein said RF amplifier includes an input connected to the secondary winding of said coupling transformer and including a first amplifying stage with a first FET transistor having a grounded source, a gate forming said input, and a drain, a second amplifying stage including a second FET having a source connected to the drain of said first FET, a grounded gate, and a drain providing an amplified RF signal output.

10. A directional locating device as claimed in claim 11, wherein said AF amplifying means includes first and second amplifying stages, volume control means connected between the output of said first amplifier stage and the input of said second amplifier stage, and said second amplifying stage including a pair of amplifying transistors connected in a Darlington connection and the output of said second amplifying stage being connected to said speaker.

11. A directional locating device as claimed in claim 1, wherein said means for transmitting is mounted on a collar adapted to be mounted on a hunting dog, and further including an RF antenna adapted to be mounted on said collar; and said receiving means is adapted to be hand-held and rotated in a substantially horizontal plane to rotate said directional antenna to a given position.

* * * * *